US012582965B2

(12) United States Patent
Lee et al.

(10) Patent No.: US 12,582,965 B2
(45) Date of Patent: Mar. 24, 2026

(54) PREPARATION METHOD OF SUPER ABSORBENT POLYMER

(71) Applicant: LG CHEM, LTD., Seoul (KR)

(72) Inventors: Seul Ah Lee, Daejeon (KR); Yoon Jae Min, Daejeon (KR); Ui Seok Chung, Daejeon (KR); Gicheul Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 774 days.

(21) Appl. No.: 17/919,273

(22) PCT Filed: Nov. 10, 2021

(86) PCT No.: PCT/KR2021/016319

§ 371 (c)(1),
(2) Date: Oct. 16, 2022

(87) PCT Pub. No.: WO2022/114609

PCT Pub. Date: Jun. 2, 2022

(65) Prior Publication Data

US 2023/0149898 A1 May 18, 2023

(30) Foreign Application Priority Data

Nov. 27, 2020 (KR) ........................ 10-2020-0162891
Nov. 8, 2021 (KR) ........................ 10-2021-0152461

(51) Int. Cl.

*B01J 20/26* (2006.01)
*B01J 20/28* (2006.01)
*B01J 20/32* (2006.01)
*C08F 220/06* (2006.01)
*C08J 3/24* (2006.01)

(52) U.S. Cl.

CPC ....... *B01J 20/267* (2013.01); *B01J 20/28078* (2013.01); *B01J 20/3282* (2013.01); *B01J 2220/68* (2013.01)

(58) Field of Classification Search

CPC ......................... B01J 20/267; B01J 20/28078; B01J 20/3282; B01J 2220/68; C08F 2810/20; C08F 220/06; C08J 3/245
See application file for complete search history.

(56) References Cited

U.S. PATENT DOCUMENTS 5,728,742 A 3/1998 Staples et al.
12,024,577 B2 * 7/2024 Min ........................ C08J 3/075
12,239,956 B2 * 3/2025 Kim .......................... B29B 9/12
12,337,294 B2 * 6/2025 Min ......................... C08K 5/11
2005/0118423 A1 6/2005 Adachi et al.
2008/0221229 A1 9/2008 Torii et al.
2011/0301560 A1 12/2011 Fujimura et al.
2015/0225514 A1 8/2015 Kimura et al.
2018/0037686 A1 2/2018 Lee et al.
2018/0318793 A1 11/2018 Yoon et al.
2019/0308171 A1 10/2019 Kim et al.
2020/0188876 A1 * 6/2020 Kim ................... B01J 20/28085
2021/0009725 A1 1/2021 Nam et al.
2021/0023529 A1 1/2021 Lee et al.
2021/0031169 A1 2/2021 Kim et al.
2021/0094017 A1 4/2021 Choi et al.
2023/0201801 A1 * 6/2023 Kim ..................... B01J 20/3021
252/194

FOREIGN PATENT DOCUMENTS

| | | | |
|---|---|---|---|
| CA | 2749750 | A1 | 10/2009 |
| CN | 110372891 | A | 10/2019 |
| CN | 111819230 | A | 10/2020 |
| CN | 111868152 | A | 10/2020 |
| EP | 0897304 | A1 | 2/1999 |
| EP | 3636698 | A1 | 4/2020 |
| EP | 3248991 | B1 | 8/2020 |
| JP | H08-157606 | A | 6/1996 |
| JP | 2004-261796 | A | 9/2004 |
| JP | 2005-097569 | A | 4/2005 |
| JP | 2005-105254 | A | 4/2005 |
| JP | 5473680 | B2 | 4/2014 |
| JP | 2017-206646 | A | 11/2017 |
| JP | 6246746 | B2 | 12/2017 |
| JP | 2018-203997 | A | 12/2018 |
| KR | 10-2000-0005217 | A | 1/2000 |
| KR | 10-2011-0114535 | A | 10/2011 |
| KR | 10-2016-0081533 | A | 7/2016 |
| KR | 10-2019-0114777 | A | 10/2019 |
| KR | 10-2020-0067041 | A | 6/2020 |

(Continued)

OTHER PUBLICATIONS

International Search Report (with translation) and Written Opinion dated Mar. 4, 2022, issued in corresponding International Patent Application No. PCT/KR2021/0163219.

(Continued)

*Primary Examiner* — Yong L Chu

(74) *Attorney, Agent, or Firm* — Morgan, Lewis & Bockius LLP

(57) ABSTRACT

The present disclosure relates to a preparation method of a super absorbent polymer. More specifically, it relates to a preparation method of a super absorbent polymer with improved permeability and anti-caking efficiency while having a high absorption rate by adding an additive having a specific structure to the hydrogel polymer polymerized in the presence of an encapsulated foaming agent, followed by coarse pulverization.

15 Claims, No Drawings

(56) References Cited

FOREIGN PATENT DOCUMENTS

| | | | | | |
|---|---|---|---|---|---|
| KR | 10-2020-0071032 | A | | 6/2020 | |
| KR | 10-2020-0075195 | A | | 6/2020 | |
| KR | 10-2124670 | B1 | | 6/2020 | |
| KR | 10-2020-0087616 | A | | 7/2020 | |
| WO | WO-9738740 | A1 | * | 10/1997 | ......... A61L 28/0026 |
| WO | 2010/073658 | A1 | | 7/2010 | |
| WO | 2012/133734 | A1 | | 10/2012 | |
| WO | 2020/122559 | A1 | | 6/2020 | |

OTHER PUBLICATIONS

Odian, Principles of Polymerization, Second Edition, 1981, p. 203.
Schwalm, UV Coatings Basics, Recent Developments and New Applications, 2006, p. 115.
Extended European Search Report dated Jul. 19, 2023, issued in corresponding European Patent Application No. 21898435.9.
Office Action dated Aug. 8, 2024, of the corresponding Chinese Patent Application No. 202180022276.8.

* cited by examiner

PREPARATION METHOD OF SUPER ABSORBENT POLYMER

TECHNICAL FIELD

Cross-Reference to Related Application(s)

This application claims the benefit of Korean Patent Applications No. 10-2020-0162891 filed on Nov. 27, 2020 and No. 10-2021-0152461 filed on Nov. 8, 2021 with the Korean Intellectual Property Office, the disclosures of which are incorporated herein by reference in their entirety.

The present disclosure relates to a preparation method of a super absorbent polymer. More specifically, it relates to a preparation method of the super absorbent polymer with improved permeability and anti-caking efficiency while having a high absorption rate.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to more efficiently absorb a large amount of liquid such as urine, it is necessary for the super absorbent polymer to exhibit high absorption performance as well as fast absorption rate. Further, the super absorbent polymer should not release the absorbed liquid even under external pressure, and additionally it should well retain the shape even in a state where the volume is expanded (swelled) by absorbing liquid, thereby exhibiting excellent permeability.

The super absorbent polymer includes a plurality of hydrophilic moieties on its surface in order to exhibit high absorption properties for liquids, specifically water. Therefore, when exposed to air, agglomeration and a caking phenomenon between the super absorbent polymer particles have occurred by absorbing moisture contained in the air.

Accordingly, there is a continuous demand for the development of a super absorbent polymer having improved permeability without reducing the absorption rate while preventing the caking phenomenon between super absorbent polymer particles, in addition to the improvement of centrifuge retention capacity (CRC) and absorbency under pressure (AUP), which are physical properties indicating basic absorbency and water retention capacity of the super absorbent polymer.

DETAILED DESCRIPTION OF THE INVENTION

Technical Problem

Accordingly, the present disclosure relates to a preparation method of a super absorbent polymer with improved permeability and anti-caking efficiency while having a high absorption rate by polymerizing a monomer in the presence of an encapsulated foaming agent, and adding an additive having a specific structure to the hydrogel polymer, followed by coarse pulverization.

Technical Solution

In order to solve the above problems, there is provided a preparation method of a super absorbent polymer including a step of forming a hydrogel polymer by cross-linking polymerization of a water-soluble ethylene-based unsaturated monomer having at least partially neutralized acidic groups in the presence of an internal cross-linking agent, an encapsulated foaming agent, and a polymerization initiator (Step 1);

a step of coarsely pulverizing the hydrogel polymer after mixing it with a carboxylic acid-based additive (Step 2);

a step of drying and pulverizing the coarsely pulverized hydrogel polymer to prepare a powdery base resin (Step 3); and a step of further cross-linking the surface of the base resin in the presence of a surface cross-linking agent to form a surface cross-linked layer (Step 4), wherein the carboxylic acid-based additive is at least one selected from the group consisting of a carboxylic acid represented by the following Chemical Formula 1 and a salt thereof:

[Chemical Formula 1]

$$A\text{—}(B_1\text{—}B_2)_n\text{—}C$$

in Chemical Formula 1,

A is C5 to C21 alkyl, $B_1$ is —OCO—, —COO—, or —COOCH($R_1$)COO—, $B_2$ is —$CH_2$—, —$CH_2CH_2$—, —CH($R_2$)—, —CH=CH—, or —C≡C—, wherein $R_1$ and $R_2$ are each independently C1 to C4 alkyl, n is an integer of 1 to 3, and C is a carboxyl group.

Advantageous Effects

According to the preparation method of the super absorbent polymer of the present disclosure, it is possible to prepare a super absorbent polymer having improved permeability and anti-caking efficiency without reducing the absorption rate by adding an additive having a specific structure to the hydrogel polymer polymerized in the presence of an encapsulated foaming agent, followed by coarse pulverization. In addition, it is possible to improve permeability and anti-caking efficiency without adding an inorganic material added in the surface cross-linking step, thereby preventing a decrease in absorption performance due to the addition of the inorganic material.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the preparation method of a super absorbent polymer and the super absorbent polymer will be described in more detail according to specific embodiments of the present invention.

The terminologies are used merely to refer to specific embodiments, and are not intended to restrict the present disclosure unless it is explicitly expressed. Singular expressions of the present disclosure may include plural expressions unless they are differently expressed contextually.

According to one embodiment of the present disclosure, there is provided a preparation method of a super absorbent polymer including a step of forming a hydrogel polymer by cross-linking polymerization of a water-soluble ethylene-based unsaturated monomer having at least partially neutralized acidic groups in the presence of an internal cross-linking agent, an encapsulated foaming agent, and a polymerization initiator (Step 1);

a step of coarsely pulverizing the hydrogel polymer after mixing it with a carboxylic acid-based additive (Step 2);

a step of drying and pulverizing the coarsely pulverized hydrogel polymer to prepare a powdery base resin (Step 3); and a step of further cross-linking the surface of the base resin in the presence of a surface cross-linking agent to form a surface cross-linked layer (Step 4), wherein the carboxylic acid-based additive is at least one selected from the group consisting of a carboxylic acid represented by the following Chemical Formula 1 and a salt thereof:

[Chemical Formula 1]

$$A\left(B_1-B_2\right)_n C$$

in Chemical Formula 1,

A is C5 to C21 alkyl, $B_1$ is —OCO—, —COO—, or —COOCH($R_1$)COO—, $B_2$ is —$CH_2$—, —$CH_2CH_2$—, —CH($R_2$)—, —CH=CH—, or —C≡C—, wherein $R_1$ and $R_2$ are each independently C1 to C4 alkyl, n is an integer of 1 to 3, and C is a carboxyl group.

The terminology "polymer" in the present disclosure is in a state in which a water-soluble ethylene-based unsaturated monomer is polymerized, and may include all moisture content ranges, or all particle diameter ranges. Among the polymers, a polymer having a moisture content of about 30 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which a water-soluble ethylene-based unsaturated monomer having at least partially neutralized acidic groups is polymerized and cross-linked by an internal cross-linking agent.

In addition, the terminology "super absorbent polymer" is used to encompass all of a cross-linked polymer in which a water-soluble ethylene-based unsaturated monomer having at least partially neutralized acidic groups is polymerized or a base resin in the form of powder consisting of super absorbent polymer particles in which the cross-linked polymer is pulverized, and the cross-linked polymer or the base resin further processed, for example, drying, pulverization, classification, surface cross-linking, etc., to be in a state suitable for commercialization, depending on the context. Accordingly, the terminology "super absorbent polymer" may be interpreted as encompassing a composition including a super absorbent polymer, that is, a plurality of super absorbent polymer particles.

In addition, the terminology "normal super absorbent polymer particles" refers to particles having a particle diameter of 150 μm to 850 μm among super absorbent polymer particles.

In addition, the terminology "fine powder" refers to particles having a particle diameter of less than 150 μm among super absorbent polymer particles.

In addition, the terminology "chopping" refers to cutting the hydrogel polymer into small pieces to increase drying efficiency, and is used separately from pulverization to a normal particle size.

In recent years, how long the dry state of the surface of a diaper can be maintained in a situation in which a hygiene material, particularly the diaper, is used has become an important measure for estimating the characteristics of the diaper. Accordingly, in addition to improvement of water retention capacity and absorbency under pressure, which are basic physical properties of the super absorbent polymer, improvement of permeability and prevention of a caking phenomenon have become important issues.

In particular, in the prior art, a method of using an inorganic material such as aluminum sulfate in the surface cross-linking step was used to improve dispersibility of the surface cross-linking solution, thereby increasing the permeability and anti-caking (A/C) efficiency of the super absorbent polymer to be finally prepared. However, when such an inorganic material is added, there has been a problem in that the absorbency under pressure of the super absorbent polymer is reduced.

Accordingly, the present inventors have found that when a carboxylic acid-based additive having a specific structure is added to the hydrogel polymer before a chopping step of the hydrogel polymer, that is, before coarse pulverization while using an encapsulated foaming agent during polymerization, the permeability and anti-caking efficiency of the super absorbent polymer to be finally prepared can be simultaneously increased without the use of such an inorganic material, thereby completing the present invention. Accordingly, it is possible to prevent a decrease in absorption performance due to the use of an inorganic material such as aluminum sulfate in the surface cross-linking step.

Herein, the carboxylic acid-based additive added to the hydrogel polymer before coarse pulverization is at least one compound selected from the group consisting of the carboxylic acid represented by the Chemical Formula 1 and a salt thereof, and has a hydrophobic functional group and a hydrophilic functional group at the same time. Meanwhile, since the water-soluble ethylene-based unsaturated monomer contains an acidic group (—COOH) and/or a neutralized acidic group (—COO$^-$), a large amount of hydrophilic moiety is present on a surface of the hydrogel polymer prepared by polymerization due to the acidic group (—COOH) and/or the neutralized acidic group (—COO$^-$) remaining without participating in polymerization. Therefore, when the additive is added to the hydrogel polymer, a hydrophilic functional group of the additive is adsorbed to at least some part of the hydrophilic moiety present on the surface of the hydrogel polymer, and the surface of the polymer to which the additive is adsorbed becomes hydrophobic by a hydrophobic functional group located at the other end of the additive. Accordingly, the hydrogel polymer mixed with the carboxylic acid-based additive can be easily coarsely pulverized, and agglomeration between the coarsely pulverized hydrogel polymers can also be suppressed.

More specifically, in the carboxylic acid-based additive, the hydrophobic functional group is a C5 to C21 alkyl group (part A), and the hydrophilic functional group is part C, specifically, a carboxyl group (COOH) or a carboxylate group (—COO$^-$) in the case of a salt. The hydrophobic functional group and the hydrophilic functional group are respectively located at both ends of the additive. In particular, the carboxylic acid-based additive further includes part ($B_1$-$B_2$) in addition to part A and part C at both ends, and the part ($B_1$-$B_2$) improves adsorption performance with respect to the polymer surface, which may be insufficient only with the part C. Accordingly, the additive having the structure of Chemical Formula 1 has excellent adsorption performance with respect to the polymer surface exhibiting hydrophilicity compared to the compound having an A-C structure without the part ($B_1$-$B_2$).

Accordingly, since at least some of the additive is also present on the surface of the super absorbent polymer particles to be finally prepared. Thus, even if an additional hydrophobic additive is not added to the base resin, agglomeration and caking between the particles can be prevented and the permeability can also be improved.

Hereinafter, the preparation method of the super absorbent polymer composition according to an exemplary embodiment will be described in more detail.

(Step 1)

The above step is to form a hydrogel polymer by cross-linking polymerization of a water-soluble ethylene-based unsaturated monomer having at least partially neutralized acidic groups in the presence of an internal cross-linking agent, an encapsulated foaming agent, and a polymerization initiator. The step may include a step of preparing a monomer composition by mixing the water-soluble ethylene-based unsaturated monomer, encapsulated foaming agent, internal cross-linking agent and polymerization initiator, and a step of forming a hydrogel polymer by thermal polymerization or photopolymerization of the monomer composition.

The water-soluble ethylene-based unsaturated monomer may be any monomer commonly used in the preparation of a super absorbent polymer. As a non-limiting example, the water-soluble ethylene-based unsaturated monomer may be a compound represented by the following Chemical Formula 2:

R—COOM' [Chemical Formula 2]

in Chemical Formula 2,

R is a C2 to C5 alkyl group having an unsaturated bond, and

M' is a hydrogen atom, a monovalent or divalent metal, an ammonium group, or an organic amine salt.

Preferably, the monomer may be at least one selected from the group consisting of (meth)acrylic acid, and a monovalent (alkali)metal salt, a divalent metal salt, an ammonium salt and an organic amine salt of the acid.

When (meth)acrylic acid and/or a salt thereof is used as a water-soluble ethylene-based unsaturated monomer, it is advantageous to obtain a super absorbent polymer having improved absorption performance. In addition, maleic anhydride, fumaric acid, crotonic acid, itaconic acid, 2-acryloylethane sulfonic acid, 2-methacryloylethanesulfonic acid, 2-(meth)acryloylpropanesulfonic acid, 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth)acrylamide, or the like may be used as the monomer.

Herein, the water-soluble ethylene-based unsaturated monomer may have acidic groups, and at least some of the acidic groups may be neutralized by a neutralizing agent. Specifically, in the step of mixing the water-soluble ethylene-based unsaturated monomer having acidic groups, the internal cross-linking agent, the polymerization initiator and the neutralizing agent, at least some of the acidic groups of the water-soluble ethylene-based unsaturated monomer may be neutralized. In this case, a basic substance such as sodium hydroxide, potassium hydroxide, and ammonium hydroxide capable of neutralizing acidic groups may be used as the neutralizing agent.

In addition, a degree of neutralization of the water-soluble ethylene-based unsaturated monomer may be 50 to 90 mol %, 60 to 85 mol %, 65 to 85 mol %, or 65 to 75 mol %, wherein the degree of neutralization refers to the degree to which the acidic groups contained in the water-soluble ethylene-based unsaturated monomer are neutralized by the neutralizing agent. A range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the water-soluble ethylene-based unsaturated monomers by cross-linking. The cross-linking in the above step proceeds regardless of the surface or the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, any compound may be used as long as it allows the introduction of cross-linking bonds during polymerization of the water-soluble ethylene-based unsaturated monomer. As a non-limiting example, the internal cross-linking agent may be a multifunctional cross-linking agent. For example, it may be acrylate-based compounds such as N,N'-methylenebisacrylamide, trimethylpropane tri(meth)acrylate, ethylene glycol di(meth)acrylate, polyethylene glycol (meth)acrylate, polyethylene glycol di(meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, and pentaerythritol tetraacrylate; epoxy compounds such as ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether, and polyglycerol polyglycidyl ether; triarylamine; propylene glycol; glycerin; or ethylene carbonate, and theses may be used alone or in combination of two or more. However, the present disclosure is not limited thereto.

According to one embodiment, the epoxy-based compound may be used as the internal cross-linking agent. For example, ethylene glycol diglycidyl ether may be used as the internal cross-linking agent, and even in this case, foaming by the foaming agent may be stably performed by the hydrophobic particles. In addition, an acrylate-based compound such as polyethylene glycol di(meth)acrylate together with the epoxy-based compound may be used as an internal cross-linking agent.

The cross-linking polymerization of the water-soluble ethylene-based unsaturated monomer in the presence of the internal cross-linking agent may be performed by thermal polymerization, photopolymerization or hybrid polymerization in the presence of a polymerization initiator with or without a thickener, a plasticizer, a preservation stabilizer, an antioxidant, etc., but the specific details will be described later.

In the monomer composition, the internal cross-linking agent may be used in an amount of 0.01 to 5 parts by weight based on 100 parts by weight of the water-soluble ethylene-based unsaturated monomer. For example, the internal cross-linking agent may be used in an amount of 0.01 parts by weight or more, 0.05 parts by weight or more, or 0.1 parts by weight or more, and 5 parts by weight or less, 3 parts by weight or less, 2 parts by weight or less, 1 part by weight or less, or 0.5 parts by weight or less based on 100 parts by weight of the water-soluble ethylene-based unsaturated monomer. When too little internal cross-linking agent is used, cross-linking does not occur sufficiently, and thus it may be difficult to achieve strength above an appropriate level, and when too much internal cross-linking agent is used, the internal cross-linking density increases, and thus it may be difficult to achieve a desired level of water retention capacity.

In addition, the polymerization initiator may be properly selected depending on the polymerization method. In the case of a thermal polymerization, a thermal polymerization initiator is used, and in the case of a photopolymerization, a photopolymerization initiator is used. Further, in the case of a hybrid polymerization method (a method using both heat and light), both the thermal polymerization initiator and the photopolymerization initiator can be used. However, even by the photopolymerization method, a certain amount heat is generated by UV radiation and the like, and some heat occurs as the polymerization reaction, an exothermal reaction, progresses. Therefore, the composition may additionally include the thermal polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, specific examples of the acyl phosphine include diphenyl(2,4,6-trimethylbenzoyl) phosphine oxide, phenylbis(2,4,6-trimethylbenzoyl)phosphine oxide, ethyl(2,4,6-trimethylbenzoyl)phenylphosphinate, and the like. More various photopolymerization initiators are well disclosed in "UV Coatings: Basics, Recent Developments and New Application (Elsevier, 2007)" written by Reinhold Schwalm, p 115, and the present disclosure is not limited thereto.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate ($(NH_4)_2S_2O_8$), and the like may be used as examples of the persulfate-based initiators; and 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane] dihydrochloride, 4,4-azobis-(4-cyanovaleric acid), and the like may be used as examples of the azo-based initiators. More various thermal polymerization initiators are well disclosed in 'Principle of Polymerization (Wiley, 1981)' written by Odian, p 203, and the present disclosure is not limited thereto.

The polymerization initiator may be used in an amount of 2 parts by weight or less based on 100 parts by weight of the water-soluble ethylene-based unsaturated monomer. When the concentration of the polymerization initiator is excessively low, the polymerization rate becomes slow, and a large amount of residual monomers may be extracted from the final product. Conversely, when the concentration of the polymerization initiator is higher than the above range, polymer chains forming a network are shortened, so that the extractable content increases and absorbency under pressure decreases, thereby lowering physical properties of the polymer.

The monomer mixture may further include an additive such as a thickener, a plasticizer, a preservation stabilizer, an antioxidant, and the like, if necessary.

In addition, the monomer composition containing the monomer may be, for example, in the form of a solution dissolved in a solvent such as water. The solid content of the monomer composition in a solution state, that is, the concentration of the monomer, the internal cross-linking agent, and the polymerization initiator may be appropriately adjusted in consideration of the polymerization time and reaction conditions. For example, the solid content of the monomer composition may be 10 to 80 wt %, 15 to 60 wt %, or 30 to 50 wt %.

When the monomer composition has the solid content in the above range, it may be advantageous for controlling the pulverization efficiency during pulverization of the polymer to be described later while eliminating the need to remove unreacted monomers after polymerization by using a gel effect phenomenon occurring in the polymerization reaction of a high-concentration aqueous solution.

At this time, any solvent which can dissolve the above components may be used without limitation. For example, the solvent may be at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide.

In addition, the encapsulated foaming agent refers to a thermally expandable microcapsule foaming agent having a core-shell structure, and the core-shell structure has a core including a hydrocarbon and a shell formed of a thermoplastic resin on the core. Specifically, the hydrocarbon constituting the core is a liquid hydrocarbon having a low boiling point and is easily vaporized by heat. Therefore, when heat is applied to the encapsulated foaming agent, the thermoplastic resin constituting the shell is softened and the liquid hydrocarbon of the core is vaporized at the same time. In addition, as the pressure inside the capsule increases, the encapsulated foaming agent expands, and accordingly, bubbles having an increased size than the existing size are formed.

Accordingly, the encapsulated foaming agent generates hydrocarbon gas, and is distinguished from an organic foaming agent that generates nitrogen gas through an exothermic decomposition reaction between monomers participating in the production of a polymer, and an inorganic foaming agent that foams carbon dioxide gas by absorbing heat generated in the production of a polymer.

The encapsulated foaming agent may have different expansion characteristics depending on the components constituting the core and the shell, and the weight and diameter of each component. Therefore, the encapsulated foaming agent can be expanded to a desired size by adjusting them, thereby controlling the porosity of the super absorbent polymer.

Specifically, the encapsulated foaming agent has a particle shape having an average diameter ($D_0$) of 5 to 30 μm before expansion. It is difficult to manufacture the encapsulated foaming agent to have an average diameter of less than 5 μm. When the average diameter of the encapsulated foaming agent exceeds 30 μm, it may be difficult to efficiently increase the surface area because the size of pores is too large. Therefore, when the encapsulated foaming agent has the average diameter as described above, it can be determined that the encapsulated foaming agent is suitable for achieving an appropriate pore structure in the resin.

For example, the average diameter before expansion of the encapsulated foaming agent may be 5 μm or more, 6 μm or more, 7 μm or more, 8 μm or more, or 10 μm or more, and 30 μm or less, 25 μm or less, 20 μm or less, 17 μm or less, 16 μm or less, or 15 μm or less.

The average diameter ($D_0$) of the encapsulated foaming agent before expansion can be measured by measuring the diameter of each encapsulated foaming agent particle as an average Feret diameter with an optical microscope, and then obtaining an average value thereof.

In this case, a capsule thickness of the encapsulated foaming agent may be 2 to 15 μm.

In addition, the encapsulated foaming agent has a maximum expansion size in air of 20 to 190 μm. Herein, the "maximum expansion size of the encapsulated foaming agent" means a diameter range of the top 10 wt % of the highly expanded particles after applying heat to the encapsulated foaming agent. It is difficult to manufacture the encapsulated foaming agent such that the maximum expansion size in air is smaller than 20 μm, and when the maximum expansion size in air exceeds 190 μm, it may be difficult to efficiently increase the surface area because the size of pores is too large.

For example, the encapsulated foaming agent may have a maximum expansion size in air of 50 to 190 μm, 70 to 190 μm, 75 to 190 μm, or 80 to 150 μm.

The maximum expansion size in air of the encapsulated foaming agent may be determined by applying 0.2 g of the encapsulated foaming agent on a glass Petri dish and leaving it on a hot plate preheated to 150° C. for 10 minutes, and then observing the expanded encapsulated foaming agent with an optical microscope. Then, it may be obtained by measuring the diameter of the top 10 wt % of the highly expanded particles as an average Feret diameter with an optical microscope.

In addition, the encapsulated foaming agent has a maximum expansion ratio in air of 5 to 15 times. Herein, the "maximum expansion ratio of the encapsulated foaming agent" means a ratio ($D_M/D_0$) of the average diameter ($D_M$) of the top 10 wt % of the highly expanded particles after applying heat to the average diameter ($D_0$) of the encapsulated foaming agent measured before applying heat. When the maximum expansion ratio in air of the encapsulated foaming agent is less than 5 times, an appropriate pore structure cannot be formed in the super absorbent polymer, so there is a problem in that it is impossible to manufacture a super absorbent polymer with improved absorbency and absorption rate. It is difficult to manufacture the encapsulated foaming agent such that the maximum expansion ratio in air exceeds 15 times, considering the average diameter of the encapsulated foaming agent before expansion. Therefore, it can be determined that the encapsulated foaming agent having the maximum expansion ratio within the above range is suitable for forming a pore structure suitable for the super absorbent polymer.

For example, the maximum expansion ratio in air of the encapsulated foaming agent may be 5 times or more, 7 times or more, or 8 times or more, and 15 times or less, 13 times or less, 11 times or less, or 10 times or less.

At this time, the average diameter ($D_0$) of the encapsulated foaming agent measured before applying heat may be measured as described above. In addition, the average diameter ($D_M$) of the top 10 wt % of the highly expanded particles after applying heat may be determined by applying 0.2 g of the encapsulated foaming agent on a glass Petri dish and leaving it on a hot plate preheated to 150° C. for 10 minutes, and then observing the expanded encapsulated foaming agent with an optical microscope. Then, it may be obtained by measuring the diameter of each of the top 10 wt % of the particles as an average Feret diameter with an optical microscope, and then obtaining an average value thereof.

The expansion characteristics of the encapsulated foaming agent may be further specified in Examples to be described later.

The reason for measuring the maximum expansion size and the maximum expansion ratio of the encapsulated foaming agent in air is to determine whether pores having a desired size are formed in the super absorbent polymer to be prepared using the encapsulated foaming agent. Specifically, the shape in which the foaming agent is foamed may vary depending on the preparation conditions of the super absorbent polymer, so it is difficult to define the foamed shape. Therefore, the expansion size and the expansion ratio are determined by first foaming the encapsulated foaming agent in air, and confirming whether the encapsulated foaming agent is suitable for forming the desired pores.

The hydrocarbon constituting the core of the encapsulated foaming agent may be at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane. Among them, the C3 to C5 hydrocarbons (n-propane, n-butane, iso-butane, cyclobutane, n-pentane, iso-pentane, cyclopentane) are suitable for forming pores having the above-mentioned size, and iso-butane may be most suitable.

In addition, the thermoplastic resin constituting the shell of the encapsulated foaming agent may be a polymer formed from at least one monomer selected from the group consisting of (meth)acrylate-based compounds, (meth)acrylonitrile-based compounds, aromatic vinyl compounds, vinyl acetate compounds, and halogenated vinyl compounds. Among them, a copolymer of (meth)acrylate and (meth) acrylonitrile may be most suitable for forming pores having the above-mentioned size.

In addition, the foaming start temperature ($T_{start}$) of the encapsulated foaming agent may be 60° C. to 120° C., 65° C. to 120° C., or 70° C. to 80° C., and the maximum foaming temperature ($T_{max}$) may be 100° C. to 160° C., 105° C. to 155° C., or 110° C. to 120° C. Within the above range, foaming may occur easily in a subsequent thermal polymerization process or drying process to introduce a pore structure in the polymer. The foaming start temperature and the foaming maximum temperature can be measured using a thermomechanical analyzer.

In addition, the encapsulated foaming agent may be used in an amount of 0.005 to 1 part by weight based on 100 parts by weight of the water-soluble ethylene-based unsaturated monomer. When the content of the foaming agent is less than 0.005 parts by weight, the effect of adding the foaming agent may be insignificant. When the content of the foaming agent exceeds 1 part by weight, there are too many pores in the cross-linked polymer, so that gel strength of the super absorbent polymer to be prepared decreases and the density also decreases, which may cause problems in distribution and storage. For example, the encapsulated foaming agent may be used in an amount of 0.01 parts by weight or more, 0.03 parts by weight or more, or 0.05 parts by weight or more, and 0.8 parts by weight or less, 0.6 parts by weight or less, or 0.5 parts by weight or less based on 100 parts by weight of the water-soluble ethylene-based unsaturated monomer.

In addition, a surfactant commonly used as a foam stabilizer may be further added together with the encapsulated foaming agent. For example, the foam stabilizer may include at least one compound selected from the group consisting of an alkyl sulfate-based compound and a polyoxyethylene alkyl ether-based compound. Examples of the alkyl sulfate-based compound include sodium dodecyl sulfate, ammonium lauryl sulfate, sodium lauryl ether sulfate, sodium myreth sulfate, and the like. Examples of the polyoxyethylene alkyl ether-based compound include polyoxyethylene lauryl ether. Herein, the alkyl sulfate-based compound is an anionic surfactant, and the polyoxyethylene alkyl ether-based compound is a nonionic surfactant.

Herein, the encapsulated foaming agent and the foam stabilizer may be used in a weight ratio of 1:0.01 to 1:0.5.

Meanwhile, the cross-linking polymerization of a water-soluble ethylene-based unsaturated monomer having at least partially neutralized acidic groups may be performed without any particular limitation, as long as the hydrogel polymer can be formed by thermal polymerization, photopolymerization, or hybrid polymerization.

Specifically, the polymerization method is largely divided into thermal polymerization and photopolymerization depending on an energy source of the polymerization. In the case of thermal polymerization, it is generally carried out in a reactor equipped with an agitation spindle, such as a kneader. In the case of photopolymerization, it is generally carried out in a reactor equipped with a movable conveyor belt, or in a container with a flat bottom. However, the above-mentioned polymerization method is merely an example, and the present disclosure is not limited thereto.

For example, a hydrogel polymer may be obtained by supplying hot air to the reactor with an agitation spindle such as a kneader or heating the reactor to perform thermal polymerization. The hydrogel polymer thus obtained may have a size of several centimeters to several millimeters, according to the shape of the agitation spindle equipped in the reactor. Specifically, the size of the obtained hydrogel polymer may vary depending on the concentration and injection speed of the monomer composition injected thereto, and a hydrogel polymer having a weight average particle diameter of 2 to 50 mm may be obtained.

Further, when the photopolymerization is carried out in a reactor equipped with a movable conveyor belt or in a container with a flat bottom as described above, the obtained hydrogel polymer may be usually a sheet-like hydrogel polymer having a width of the belt. In this case, the thickness of the polymer sheet may vary depending on the concentration, injection speed or injection amount of the monomer composition to be injected, but usually, it is preferable to feed the monomer composition such that a sheet-like polymer having a thickness of about 0.5 to about 5 cm can be obtained. When the monomer mixture is fed such that the thickness of the sheet-like polymer becomes too thin, the production efficiency is low, which is undesirable. When the thickness of the sheet-like polymer is greater than 5 cm, the polymerization reaction cannot be evenly carried out over the entire thickness because of the excessive thickness.

At this time, the hydrogel polymer thus obtained may have a moisture content of 30 to 70 wt %. For example, the moisture content of the hydrogel polymer may be 35 wt % or more, 40 wt % or more, or 45 wt % or more, and 70 wt % or less, 65 wt % or less, or 60 wt % or less. When the moisture content of the hydrogel polymer is too low, it is difficult to secure an appropriate surface area in the subsequent pulverization step, and thus the pulverization may not be effective. When the moisture content of the hydrogel polymer is too high, the pressure received in the subsequent pulverization step increases, and thus the pulverization may be difficult to proceed to a desired particle size.

Meanwhile, the "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated by the weight loss due to moisture evaporation from the polymer in the process of increasing the temperature of the crumb polymer for drying through infrared heating. At this time, the drying conditions for measuring the moisture content are as follows: the temperature is increased to about 180° C. and maintained at 180° C., and the total drying time is 40 min including 5 min of a heating step.

The hydrogel polymer formed through the Step 1 has a three-dimensional network structure in which main chains formed by polymerization of the water-soluble ethylene-based unsaturated monomer are cross-linked by the internal cross-linking agent. When the hydrogel polymer has a three-dimensional network structure, water retention capacity and absorbency under pressure, which are general physical properties of the super absorbent polymer, can be significantly improved compared to a case having a two-dimensional linear structure that is not further cross-linked by an internal cross-linking agent.

(Step 2)

The above step is a step of preparing a coarsely pulverized hydrogel polymer in which hydrophobicity is imparted to the surface of the hydrogel polymer by mixing a carboxylic acid-based additive with the hydrogel polymer before the coarse pulverization.

At this time, the carboxylic acid-based additive is at least one selected from the group consisting of a carboxylic acid represented by the Chemical Formula 1 and a metal salt thereof. Specifically, the carboxylic acid-based additive is at least one selected from the group consisting of a carboxylic acid represented by the Chemical Formula 1, an alkali metal salt of a carboxylic acid represented by the Chemical Formula 1, and an alkaline earth metal salt of a carboxylic acid represented by the Chemical Formula 1. More specifically, the carboxylic acid-based additive is one of a carboxylic acid represented by the Chemical Formula 1, an alkali metal salt of a carboxylic acid represented by the Chemical Formula 1, and an alkaline earth metal salt of a carboxylic acid represented by the Chemical Formula 1.

In the Chemical Formula 1, A is a hydrophobic moiety and may be a C5 to C21 linear or branched alkyl group. However, the case where A is a linear alkyl group is more advantageous in terms of suppressing agglomeration of pulverized particles and improving dispersibility. When A is an alkyl group having less than 5 carbon atoms, there is a problem in that the chain is short, so that the agglomeration of pulverized particles cannot be effectively controlled. When A is an alkyl group having more than 21 carbon atoms, mobility of the additive may be reduced, so that the carboxylic acid-based additive may not be effectively mixed with the hydrogel polymer and the cost of the composition may increase due to an increase in the cost of the additive.

Specifically, in the Chemical Formula 1, A may be C5 to C21 linear alkyl such as n-pentyl, n-hexyl, n-heptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, n-octadecanyl, n-nonadecanyl, n-icosanyl, or n-heneicosanyl.

More specifically, A may be C6 to C18 linear alkyl. For example, A may be —$C_6H_{13}$, —$C_{11}H_{23}$, —$C_{12}H_{25}$, —$C_{17}H_{35}$, or —$C_{18}H_{37}$.

In addition, part ($B_1$-$B_2$) of the Chemical Formula 1 improves adsorption performance with respect to the polymer surface, which may be insufficient only with the part C. When the number of carbon atoms of $B_2$ is 3 or more, the distance between part $B_1$ and part C increases, and the adsorption performance with respect to the hydrogel polymer may be deteriorated.

Herein, $R_1$ and $R_2$ may each independently be C1 to C4 linear or branched alkyl. More specifically, $R_1$ and $R_2$ may each independently be methyl, ethyl, propyl, isopropyl, butyl, isobutyl, sec-butyl, or tert-butyl. Since the additive can be adsorbed on the super absorbent polymer particles, it is advantageous that the molecular structure of the additive is not bulky, and thus both $R_1$ and $R_2$ may be methyl.

In addition, n of the Chemical Formula 1 may be 1, 2, or 3. More specifically, n, which means the number of ($B_1$-$B_2$), is preferably 1, considering that the part ($B_1$-$B_2$) is for reinforcing adsorption performance with respect to part C and how long a molecular length is required in order for the carboxylic acid-based additive to be effectively adsorbed on the hydrogel polymer.

Specifically, in the Chemical Formula 1, $B_1$ may be

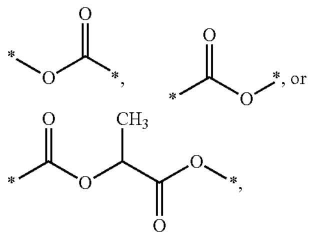

wherein * is a bonding site with a neighboring atom.

For example, B, may be

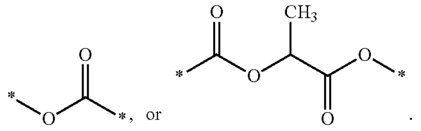

In addition, in the Chemical Formula 1, $B_2$ may be

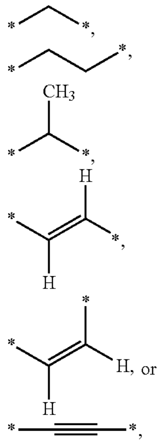

wherein * is a bonding site with a neighboring atom.

At this time, in order to improve adsorption performance of the additive with respect to the cross-linked polymer together with part C, $B_2$ is preferably

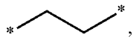, 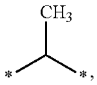, or 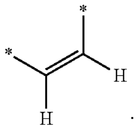.

In addition, in the Chemical Formula 1, part C is a carboxyl group (COOH) as a hydrophilic moiety, and when the carboxylic acid-based additive is a salt, it is a carboxylate group ($COO^-$).

In other words, the carboxylic acid-based additive may be a compound represented by the following Chemical Formula 1a:

[Chemical Formula 1a]

$$\left[A\text{—}\left(B_1\text{—}B_2\right)_n\text{—}COO^-\right]_k M$$

in Chemical Formula 1a,

M is $H^+$, a monovalent cation of an alkali metal, or a divalent cation of an alkaline earth metal, k is 1 if M is $H^+$ or a monovalent cation of an alkali metal, and 2 if it is a divalent cation of an alkaline earth metal, and descriptions of A, $B_1$, $B_2$ and n are as defined in the Chemical Formula 1.

More specifically, when the carboxylic acid-based additive is an alkali metal salt of the carboxylic acid represented by the Chemical Formula 1, the additive may be represented by the following Chemical Formula 1':

[Chemical Formula 1']

$$A\text{—}\left(B_1\text{—}B_2\right)_n\text{—}COO^-M_1^+$$

in Chemical Formula 1', $M_1$ is an alkali metal such as sodium or potassium, and descriptions of A, $B_1$, $B_2$ and n are as defined in the Chemical Formula 1.

In addition, when the carboxylic acid-based additive is an alkaline earth metal salt of the carboxylic acid represented by the Chemical Formula 1, the additive may be represented by the following Chemical Formula 1":

[Chemical Formula 1"]

$$\left[A\text{—}\left(B_1\text{—}B_2\right)_n\text{—}COO^-\right]_2 M_2^{2+}$$

in Chemical Formula 1", $M_2$ is an alkaline earth metal such as calcium, and descriptions of A, $B_1$, $B_2$ and n are as defined in the Chemical Formula 1.

For example, the carboxylic acid-based additive may be any one carboxylic acid selected from the group consisting of:

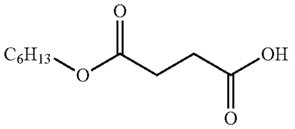

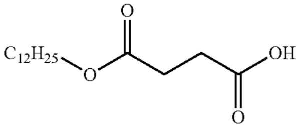

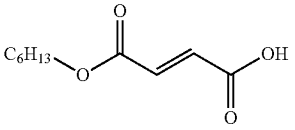

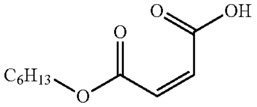

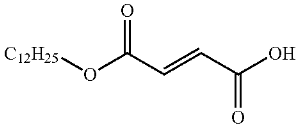

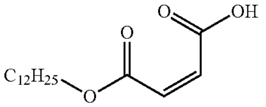

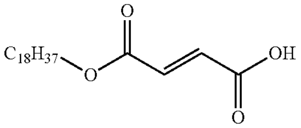

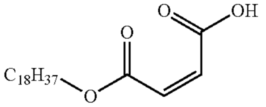

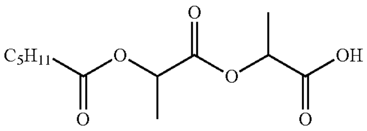

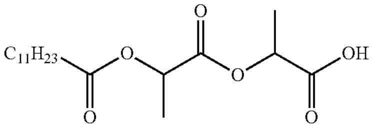

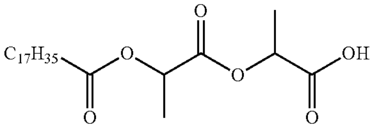

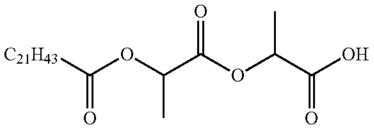

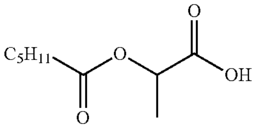

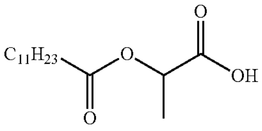

-continued
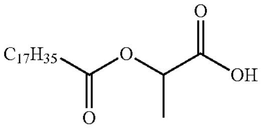
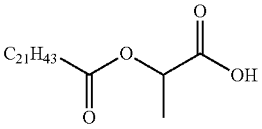
Alternatively, the carboxylic acid-based additive may be any one alkali metal salt selected from the group consisting of:
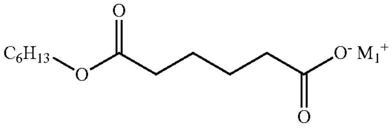
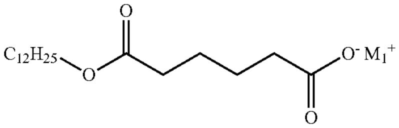
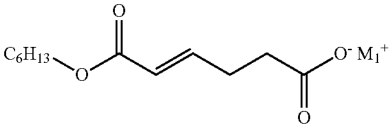
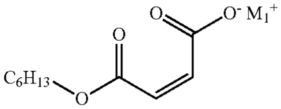
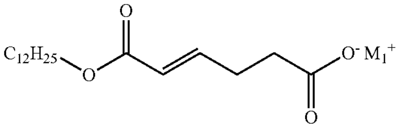
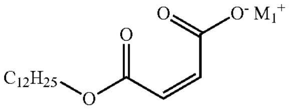
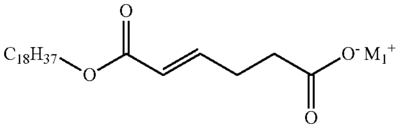
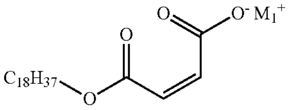
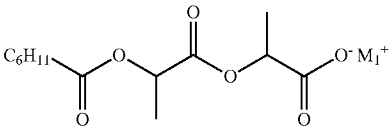
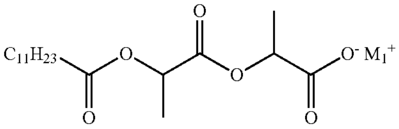
-continued
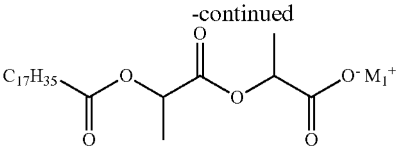
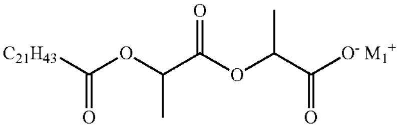
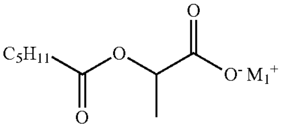
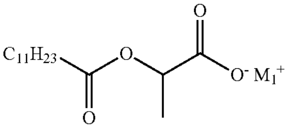
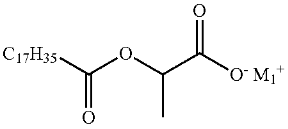
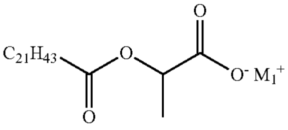
In the above formula,
$M_1$ is each independently an alkali metal.
Alternatively, the carboxylic acid-based additive may be any one alkaline earth metal salt selected from the group consisting of:
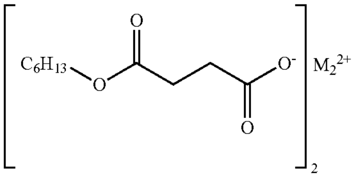
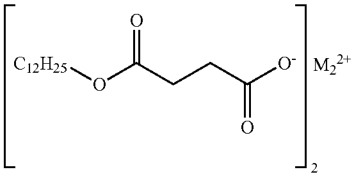
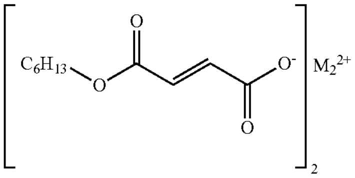
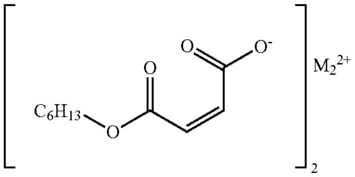

-continued
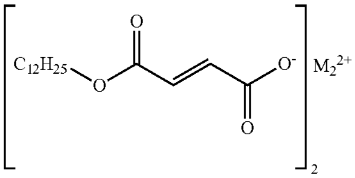
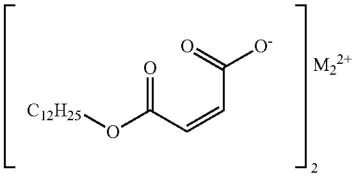
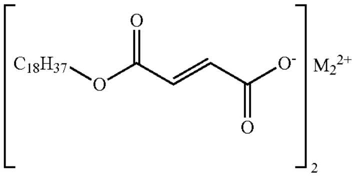
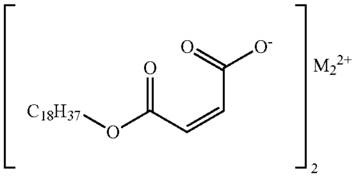
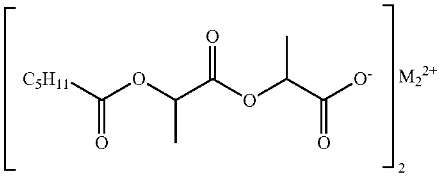
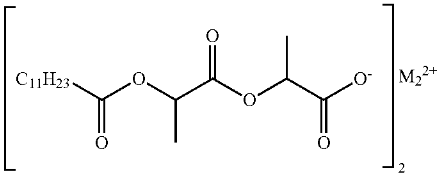
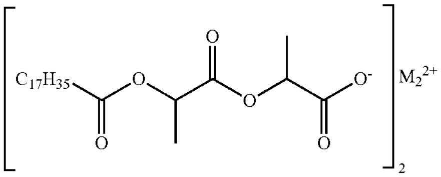
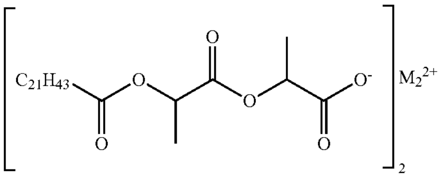
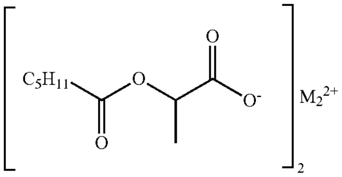
-continued
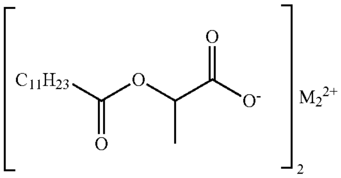
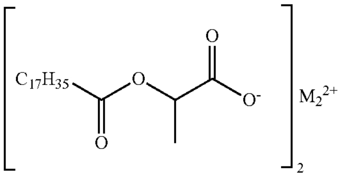
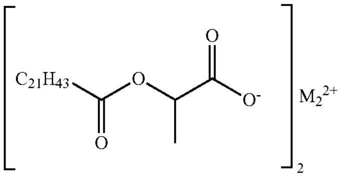
In the above formula,
$M_2$ is each independently an alkaline earth metal.
For example, the carboxylic acid-based additive may be any one of compounds represented by the following Chemical Formulae 1-1 to 1-7, but is not limited thereto:
1-1
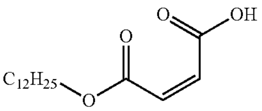
1-2
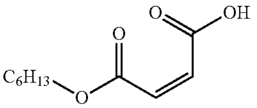
1-3
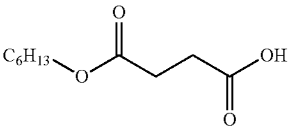
1-4
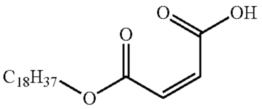
1-5
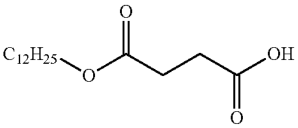
1-6
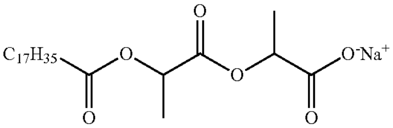

-continued 1-7

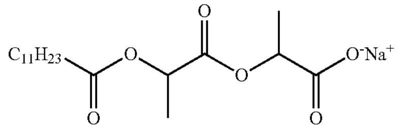

Meanwhile, the carboxylic acid-based additive may be used in an amount of 0.01 to 1.0 parts by weight based on 100 parts by weight of the hydrogel polymer. When too little additive is used, it is not uniformly adsorbed on the surface of the hydrogel polymer, which may cause re-agglomeration of the particles after pulverization. When too much additive is used, overall physical properties of the finally prepared super absorbent polymer may be deteriorated. For example, the carboxylic acid-based additive may be used in an amount of 0.01 parts by weight or more, 0.015 parts by weight or more, or 0.1 parts by weight or more, and 1.0 parts by weight or less, 0.8 parts by weight or less, 0.6 parts by weight or less, or 0.5 parts by weight or less based on 100 parts by weight of the hydrogel polymer.

A method of mixing the additive with the hydrogel polymer is not particularly limited as long as it is a method capable of uniformly mixing it with the hydrogel polymer, and may be appropriately selected and used. Specifically, the additive may be dry-mixed, dissolved in a solvent and then mixed, or melted and then mixed.

For example, the additive may be mixed in the form of a solution dissolved in a solvent. At this time, any type of inorganic solvent or organic solvent may be used without limitation, but water is most preferable for the solvent in consideration of the ease of drying and the cost of solvent recovery system. In addition, a method of putting the additive in the form of a solution and the hydrogel polymer in a reaction tank for mixing, a method of spraying the solution after putting the hydrogel polymer in a mixer, a method of continuously supplying the hydrogel polymer and the solution to a continuously operating mixer for mixing, or the like may be used.

A coarsely pulverized product of the hydrogel polymer mixed with the additive may be prepared by mixing the hydrogel polymer with the additive, followed by coarse pulverization.

At this time, the pulverizing machine used is not particularly limited, and any one selected from the group consisting of a vertical pulverizer, a turbo cutter, a turbo grinder, a rotary cutter mill, a cutter mill, a disc mill, a shred crusher, a crusher, a chopper, and a disc cutter may be used. However, the present disclosure is not limited thereto.

Among them, the coarse pulverization may be performed by a chopper, more specifically by a meat chopper. At this time, the meat chopper may include a chopping module having one or more perforated plates, and each perforated plate may be provided with a plurality of fine chopping holes having a certain size through which the hydrogel polymer can pass. In addition, a hole size of the fine chopping holes of the perforated plate may be 3 mm to 16 mm. In other words, it can be seen that the pulverization is performed by pushing the hydrogel polymer mixed with the additive such that the hydrogel polymer is pulverized while passing through the fine chopping holes of perforated plates. At this time, an extruder may be used to push out the hydrogel polymer. For example, a single- or multiple-screw extruder may be used.

Accordingly, the coarsely pulverized hydrogel polymer may have a particle diameter of 300 μm to 5000 μm. It is not technically easy to pulverize the polymer to a particle diameter of less than 300 μm, and when the particle diameter exceeds 5000 μm, the effect of increasing the efficiency of the subsequent drying step is insignificant.

Meanwhile, at least some of the additive included in the coarsely pulverized product may be present on a surface of the coarsely pulverized hydrogel polymer. Herein, "at least some of the additive is present on a surface of the coarsely pulverized hydrogel polymer" means that at least some of the additive is adsorbed or bonded on the surface of the coarsely pulverized hydrogel polymer. Specifically, the additive may be physically or chemically adsorbed on the surface of the coarsely pulverized hydrogel polymer. More specifically, the hydrophilic functional group of the additive may be physically adsorbed on the hydrophilic moiety of the surface of the coarsely pulverized hydrogel polymer by an intermolecular force such as dipole-dipole interaction. In this way, the hydrophilic moiety of the additive is physically adsorbed on the surface of the coarsely pulverized hydrogel polymer to surround the surface, and the hydrophobic moiety of the additive is not adsorbed on the surface of the polymer particles, so the polymer particles may be coated with the additive in the form of a micelle structure. This is because the carboxylic acid-based additive is not added during the polymerization process of the water-soluble ethylene-based unsaturated monomer, but is added after the polymer is formed. Thus, the re-agglomeration of the coarsely pulverized hydrogel polymers can be further suppressed compared to a case in which the additive is added during the polymerization process and the additive is present inside the polymer.

(Step 3)

The above step is a step of drying the pulverized product to dry the moisture of the hydrous super absorbent polymer particles. Specifically, drying of the pulverized product may be performed such that the moisture content of each of the plurality of super absorbent polymer particles included in the prepared super absorbent polymer is about 10 wt % or less, specifically, about 0.01 to about 10 wt %.

Herein, the drying temperature in the drying step may be about 150 to about 250° C. When the drying temperature is less than 150° C., the drying time may become excessively long and physical properties of the super absorbent polymer to be finally formed may decrease. When the drying temperature is more than 250° C., only the surface of the polymer is excessively dried, fine powder may be generated in the subsequent pulverization process, and physical properties of the final super absorbent polymer may decrease. Therefore, the drying may preferably be performed at a temperature of about 150 to about 200° C., more preferably at a temperature of about 160 to about 180° C.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 5 to about 10 wt %.

Subsequently, a step of pulverizing the dried polymer obtained through the drying step is performed.

The base resin, which is a polymer powder obtained after the pulverization step, may have a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

In order to manage the physical properties of the super absorbent polymer powder to be commercialized after the pulverization step, the base resin obtained after pulverization is classified according to particle size. Preferably, the polymer having a particle diameter of about 150 to about 850 μm is classified, and only the base resin having such a particle diameter may be subjected to a surface cross-linking reaction step. In this case, the particle diameter may be measured in accordance with the EDANA (European Disposables and Nonwovens Association) WSP 220.3.

(Step 4)

The above step is a step of further cross-linking the cross-linked polymer contained in the base resin particles using a surface cross-linking agent to form a super absorbent polymer in which a surface cross-inked layer is formed on the surface of the base resin, more specifically, on at least a part of the surface of each base resin particle.

In other words, the surface cross-linking step is a step of increasing the cross-linking density near the surface of the super absorbent polymer particles in relation to the cross-linking density inside the particles. In general, the surface cross-linking agent is applied to the surface of the super absorbent polymer particles. Accordingly, this reaction occurs on the surface of the super absorbent polymer particles, which improves cross-linking properties on the surface of the particles without substantially affecting the inside of the particles. Therefore, the surface cross-linked super absorbent polymer particles have a higher degree of cross-linking near the surface than inside.

As the surface cross-linking agent, any surface cross-linking agent that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether and glycerol polyglycidyl ether; an oxazoline compound such as oxazolidinone; a polyamine compound; a mono-, di- or poly-oxazolidinone compound; a cyclic urea compound; and the like.

Specifically, one or more, two or more, or three or more of the above-mentioned surface cross-linking agents may be used as the surface cross-linking agent, and the surface cross-linking agent may be the same as the internal cross-linking agent.

The content of the surface cross-linking agent may be appropriately selected depending on the type of the surface cross-linking agent to be specifically added or the reaction conditions. It may be used in an amount of about 0.001 to about 5 parts by weight, preferably about 0.01 to about 3 parts by weight, and more preferably about 0.02 to about 2 parts by weight based on 100 parts by weight of the base resin. When the content of the surface cross-linking agent is too small, the surface cross-linking reaction hardly occurs, and when it exceeds 5 parts by weight based on 100 parts by weight of the base resin, absorption properties such as water retention capacity may be deteriorated due to excessive surface cross-linking.

In addition, the method of mixing the surface cross-linking agent with the base resin is not particularly limited. For example, a method of adding the surface cross-linking agent and the base resin powder in a reactor for mixing, a method of spraying the surface cross-linking agent onto the base resin powder, or a method of mixing the base resin and the surface cross-linking agent while continuously providing them to a continuously operating mixer may be used.

When adding the surface cross-linking agent, water may be mixed therewith to add the surface cross-linking agent in the form of a surface cross-linking solution. When water is added thereto, there is an advantage that the surface cross-linking agent may be evenly dispersed in the polymer. At this time, the amount of water to be added may be about 1 to about 10 parts by weight based on 100 parts by weight of the base resin for the purposes of inducing a uniform dispersion of the surface cross-linking agent, preventing an agglomeration phenomenon of the polymer powder, and optimizing a surface penetration depth of the surface cross-linking agent.

According to one embodiment of the present disclosure, an alcohol-based solvent such as methanol may be added in addition to water. The alcohol-based solvent such as methanol does not participate in the surface cross-linking reaction and acts as a solvent. Accordingly, the surface cross-linking solution is slowly absorbed into the base resin, thereby achieving an effect of uniform application. At this time, the content of the alcohol-based solvent may be about 1 part by weight or more, about 2 parts by weight or more, or about 3 parts by weight or more, and about 10 parts by weight or less, about 8 parts by weight or less, or about 6 parts by weight or less based on 100 parts by weight of the base resin.

The surface cross-linking reaction may be performed by heating the base resin to which the surface cross-linking solution containing the surface cross-linking agent and the solvent is added at about 100 to about 150° C., preferably at about 110 to about 140° C. for about 15 to about 80 minutes, preferably for about 20 to about 70 minutes. When the temperature is less than 100° C., the surface cross-linking reaction may not sufficiently occur. When it exceeds 150° C., propylene glycol or propylene carbonate included as a solvent may participate in the surface cross-linking reaction, and an additional surface cross-linking reaction by these compounds may proceed.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

In addition, in the Step 4, at least one inorganic material selected from the group consisting of silica, clay, alumina, silica-alumina composite, titania, zinc oxide and aluminum sulfate may be further added together with the surface cross-linking agent. The inorganic material may be used in a powdery form or in a liquid form, and in particular, alumina powder, silica powder, silica-alumina powder, titania powder, aluminum sulfate powder, or nanosilica solution may be used.

In addition, the inorganic material may be used in an amount of 0.001 to 0.3 parts by weight based on 100 parts by weight of the base resin. When the amount of the inorganic material is more than 0.3 parts by weight based on 100 parts by weight of the base resin, the degree of surface cross-linking of the polymer particles may be increased and absorbency under pressure may be lowered, which is undesirable. However, when a small amount of the inorganic material is further added within the above-described range, there is an advantage that permeability and anti-caking efficiency can be further improved. For example, the inorganic material may be used in an amount of 0.01 parts by weight or more, 0.05 parts by weight or more, 0.1 parts by weight or more, and 0.3 parts by weight or less based on 100 parts by weight of the base resin.

In addition, after the surface cross-linked layer is formed on the surface of the base resin as described above, an inorganic material may be additionally mixed.

As the inorganic material, at least one inorganic material selected from the group consisting of silica, clay, alumina, silica-alumina composite, and titania may be used, and silica is preferable.

The inorganic material may be used in an amount of 0.001 parts by weight or more, or 0.01 parts by weight or more, and 5 parts by weight or less, 3 parts by weight or less, or 1 part by weight or less based on 100 parts by weight of the super absorbent polymer.

In order to manage the physical properties of the super absorbent polymer to be commercialized, the step of classifying the super absorbent polymer obtained after the surface cross-linking step according to particle size may be further performed. Preferably, the polymer having a particle diameter of about 150 to about 850 μm is classified, and only the super absorbent polymer having such a particle diameter can be used as a final product.

In addition, the super absorbent polymer prepared by the above method may further include a compound formed by decomposing an ester bond of Bi in the process of drying after the additive is pulverized with the hydrogel polymer, in addition to the super absorbent polymer particles and the carboxylic acid-based additive.

Specifically, when the additive is a compound in which n is 1 and $B_1$ is —OCO—, the super absorbent polymer may further include an alcohol having an A-OH structure and a compound having a HOOC—$B_2$—C structure.

In addition, when the additive is a compound in which n is 1 and $B_1$ is —COO—, the super absorbent polymer may further include a carboxylic acid having an A-COOH structure and a compound having a HO—$B_2$—C structure.

In addition, when the additive is a compound in which n is 1 and $B_1$ is —COOCH($R_1$)COO—, the super absorbent polymer may further include a carboxylic acid having an A-COOH structure and a compound having a HOCH($R_1$)COO—$B_2$—C structure.

As the super absorbent polymer further includes the compound formed by decomposing an ester bond in the additive molecule, mobility of the additives is increased, and a phenomenon of re-agglomeration after pulverization can be further prevented.

In addition, a compound having a glucose unit containing a plurality of hydroxyl groups in the molecule such as microcrystalline cellulose may not be used in the above preparation method. For example, when the super absorbent polymer composition includes microcrystalline cellulose having an average particle diameter of 1 to 10 μm such as AVICEL® PH-101 represented by the following Chemical Formula 3 available from FMC, agglomeration between the finally prepared super absorbent polymer particles may not be suppressed due to the plurality of hydroxyl groups, and thus the effect by the above-described additive may not be effectively expressed.

[Chemical Formula 3]

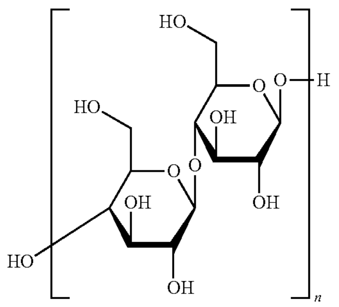

The super absorbent polymer obtained by the above preparation method may satisfy the following physical properties by achieving a balance between the absorption rate and absorption properties.

The centrifuge retention capacity (CRC) measured in accordance with the EDANA WSP 241.3 may be 25 g/g or more, 26 g/g or more, 27 g/g or more, 28 g/g or more or 29 g/g or more, and 35 g/g or less, 33 g/g or less, or 31 g/g or less.

In addition, the super absorbent polymer may have absorbency under pressure (AUP) at 0.3 psi of 20 g/g or more, 23 g/g or more, 25 g/g or more, 26 g/g or more, or 28 g/g or more, and 33 g/g or less, 32 g/g or less, or 30 g/g or less, when measured in accordance with the EDANA WSP 242.3.

In addition, the super absorbent polymer may have a vortex time (absorption rate) at 24° C. of 30 seconds or less, 29 seconds or less, 28 seconds or less, 27 seconds or less, 26 seconds or less, or 25 seconds or less. In addition, as the lower vortex time can be evaluated as the better, the lower limit is theoretically 0 seconds, but may be 10 seconds or more, 15 seconds or more, 18 seconds or more, or 20 seconds or more. Herein, the method for measuring the vortex time is specifically described in the test example to be described later.

In addition, the super absorbent polymer may have permeability (unit: seconds) measured according to the following Equation 3 of 40 seconds or less, 30 seconds or less, 25 seconds or less, 20 seconds or less, 19 seconds or less, or 15 seconds or less. As the lower permeability can be evaluated as the better, the lower limit is theoretically 0 seconds, but may be 5 seconds or more, 7 seconds or more, 10 seconds or more, or 13 seconds or more:

$$\text{Permeability(sec)} = T1 - B \qquad \text{[Equation 3]}$$

in Equation 3,

T1 is the time taken for a liquid surface to decrease from 40 mL to 20 mL after adding 0.2±0.0005 g of a classified (30 #~50 #) super absorbent polymer sample in a chromatography tube, adding saline to make a volume of the saline 50 mL, and leaving it for 30 minutes, and B is the time taken for a liquid surface to decrease from 40 mL to 20 mL in a chromatography tube filled with saline.

In addition, the super absorbent polymer may have an anti-caking (A/C) efficiency calculated by the following Equation 4 of 50% or more, 55% or more, 56% or more, 58% or more, 60% or more, or 67% or more. As the higher anti-caking efficiency can be evaluated as the better, the higher limit is theoretically 100%, but may be 99% or less, 98% or less, or 80% or less:

$$\text{Anti-caking efficiency (\%)} = \frac{S_1}{(S_2 - W_5) + S_1} * 100 \quad \text{[Equation 4]}$$

in Equation 4, $W_5$ is a weight (g) of a Petri dish having a diameter of 90 mm and a height of 15 mm, $S_1$ is a weight (g) of a super absorbent polymer sample fell on a A4 paper after evenly applying 2±0.01 g of a super absorbent polymer sample to a Petri dish weighing $W_5$, leaving the Petri dish applied with the sample in a constant temperature and humidity chamber set at a temperature of 40° C. and a humidity of 80% RH for 10 minutes, taking it out, turning it over on the A4 paper and then leaving it for 5 minutes, and $S_2$ is a weight (g) of the Petri dish at the time of measuring $S_1$.

Hereinafter, the present invention will be described in more detail with reference to examples. However, these examples are for illustrative purposes only, and the invention is not intended to be limited by these examples.

EXAMPLES

Preparation of Encapsulated Foaming Agent

As an encapsulated foaming agent used in Examples, F-36D manufactured by Matsumoto, which has a core of iso-butane and a shell of a copolymer of acrylate and acrylonitrile, was prepared. At this time, the foaming start temperature ($T_{start}$) of the F-36D is 70° C. to 80° C., and the maximum foaming temperature ($T_{max}$) is 110° C. to 120° C.

The diameter of each encapsulated foaming agent was measured as an average Feret diameter with an optical microscope. Then, an average value of the diameters of the encapsulated foaming agents was obtained and defined as the average diameter of the encapsulated foaming agent.

In addition, in order to confirm expansion characteristics of the encapsulated foaming agent, 0.2 g of the encapsulated foaming agent prepared above was applied on a glass Petri dish, and then left on a hot plate preheated to 150° C. for 10 minutes. The encapsulated foaming agent expanded slowly by heat, and this was observed with an optical microscope to determine the maximum expansion ratio and maximum expansion size of the encapsulated foaming agent in air.

A diameter of the top 10 wt % of the highly expanded particles after applying heat to the encapsulated foaming agent was defined as the maximum expansion size, and a ratio ($D_M/D_0$) of the average diameter ($D_M$) of the top 10 wt % of the highly expanded particles after applying heat to the average diameter ($D_0$) measured before applying heat to the encapsulated foaming agent was defined as the maximum expansion ratio.

The average diameter of the prepared encapsulated foaming agent before expansion was 13 μm, the maximum expansion ratio in air was about 9 times, and the maximum expansion size was about 80 to 150 μm.

Example 1

(Step 1)

100 g (1.388 mol) of acrylic acid, 0.001 g of polyethylene glycol diacrylate (Mn=508) and 0.24 g of ethylene glycol diglycidyl ether as an internal cross-linking agent, 0.008 g of diphenyl(2,4,6-trimethylbenzoyl)phosphine oxide as a photopolymerization initiator, 0.125 g of sodium persulfate as a thermal polymerization initiator, 123.5 g of 32% caustic soda solution, 0.1 g of encapsulated foaming agent (F-36D), and 0.02 g of sodium dodecyl sulfate (SDS) aqueous solution were mixed with 66.0 g of water in a 3 L glass container equipped with a stirrer and a thermometer at room temperature to prepare a monomer composition having a total solid content of 42.0 wt % (degree of neutralization of acrylic acid: 70 mol %).

Thereafter, the monomer composition was supplied at 500 to 2000 mL/min on a conveyor belt in which a belt having a width of 10 cm and a length of 2 m rotates at a speed of 50 cm/min. At the same time as the monomer composition was supplied, ultraviolet rays having an intensity of 10 $mW/cm^2$ were irradiated to perform a polymerization reaction for 60 seconds, thereby obtaining a hydrogel polymer in the form of a sheet having a moisture content of 50 wt %.

(Step 2)

Subsequently, sodium stearoyl-2-lactylate (Almax-6900, manufactured by Ilshin Wells) represented by the following Chemical Formula 1-6 was mixed with the hydrogel polymer obtained by the polymerization reaction by applying the sodium stearoyl-2-lactylate in the form of an aqueous solution in high temperature water to the hydrogel polymer in the form of a sheet such that 0.4 parts by weight based on 100 parts by weight of the hydrogel polymer was applied. Then, it was coarsely pulverized using a meat chopper such that the hydrogel polymer had a particle diameter of 300 μm to 5000 μm. As the meat chopper, a meat chopper including a perforated plate provided with a plurality of fine chopping holes having a hole size of 3 mm was used. The moisture content of the coarsely pulverized hydrogel polymer particles was 46 wt %.

[Chemical Formula 1-6]

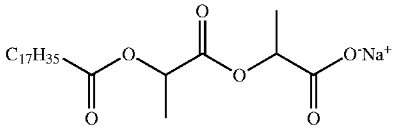

(Step 3)

Thereafter, the pulverized product was dried by flowing hot air at 180° C. for 43 minutes using a convection oven capable of changing wind direction up and down to obtain a base resin in the form of powder.

(Step 4)

Subsequently, a surface cross-linking solution was prepared with 5.8 g of ultrapure water, 5.0 g of methanol, 0.02 g of ethylene glycol diglycidyl ether (EJ-10305) and 0.01 g of glycerol polyglycidyl ether (EJ-300), added to 100 g of the obtained base resin, and then mixed for 1 minute, followed by surface cross-linking reaction at 140° C. for 35 minutes. Then, the obtained product was classified with ASTM standard mesh to obtain a super absorbent polymer powder having a particle size of 150 to 850 μm. Thereafter, 0.013 g of fumed silica (AEROSIL® 200) was further mixed based on 100 parts by weight of the obtained polymer powder to prepare a final super absorbent polymer.

Example 2

A super absorbent polymer was prepared in the same manner as in Example 1, except that 0.1 g of aluminum sulfate (AIS) was added to the surface cross-linking solution of Example 1.

Example 3

A super absorbent polymer was prepared in the same manner as in Example 1, except that 0.2 g of aluminum sulfate was added to the surface cross-linking solution of Example 1.

Example 4

A super absorbent polymer was prepared in the same manner as in Example 1, except that 0.3 g of aluminum sulfate was added to the surface cross-linking solution of Example 1.

Example 5

A super absorbent polymer was prepared in the same manner as in Example 1, except that monohexyl maleate represented by the following Chemical Formula 1-2 was used instead of the sodium stearoyl-2-lactylate in step 2 of Example 1. Herein, the monohexyl maleate represented by the following Chemical Formula 1-2 was prepared by mixing maleic acid anhydride and 1-hexanol in a molar ratio of 1:1, followed by reacting at 60° C. for 3 hours.

[Chemical Formula 1-2]

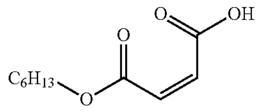

Example 6

A super absorbent polymer was prepared in the same manner as in Example 1, except that monolauryl maleate represented by the following Chemical Formula 1-1 was used instead of the sodium stearoyl-2-lactylate in step 2 of Example 1. Herein, the monolauryl maleate represented by the following Chemical Formula 1-1 was prepared by mixing maleic acid anhydride and 1-dodecanol in a molar ratio of 1:1, followed by reacting at 60° C. for 3 hours.

[Chemical Formula 1-1]

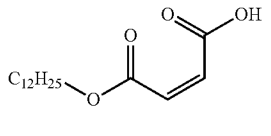

Example 7

A super absorbent polymer was prepared in the same manner as in Example 1, except that sodium lauroyl-2-lactylate (manufactured by Ilshin Wells) represented by the following Chemical Formula 1-7 was used instead of the sodium stearoyl-2-lactylate in step 2 of Example 1.

[Chemical Formula 1-7]

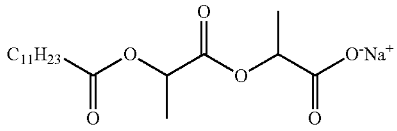

Comparative Example 1

A super absorbent polymer was prepared in the same manner as in Example 1, except that sodium stearoyl-2-lactylate was not used in step 2 of Example 1.

Comparative Example 2

A super absorbent polymer was prepared in the same manner as in Example 1, except that sodium stearoyl-2-lactylate was not used in step 2 of Example 1 and 0.3 g of aluminum sulfate was added to the surface cross-linking solution in Example 1.

Comparative Example 3

A super absorbent polymer was prepared in the same manner as in Example 1, except that sodium stearoyl-2-lactylate was not used in step 2 of Example 1 and 0.1 g of aluminum sulfate was added to the surface cross-linking solution in Example 1.

Test Example 1

The centrifuge retention capacity (CRC), absorbency under pressure (AUP), vortex time, permeability and anti-caking efficiency of the super absorbent polymers prepared in Examples and Comparative Examples were evaluated in the following manner, and the results are shown in Table 1 below. Unless otherwise indicated, all procedures were conducted in a constant temperature and humidity room (23±2° C., relative humidity of 45±10%). In order to prevent measurement errors, an average value of three measurements was taken as measurement data. In addition, physiological saline or saline used in the evaluation of the following physical properties means a 0.9 wt % sodium chloride (NaCl) aqueous solution.

(1) Centrifuge Retention Capacity (CRC)

The centrifuge retention capacity by absorption ratio under a non-loading condition of each polymer composition was measured according to the EDANA (European Disposables and Nonwovens Association) WSP 241.3 method.

Specifically, a polymer composition was obtained by classifying each of the polymer compositions prepared in Examples and Comparative Examples through a sieve of #30-50. After inserting $W_0$ (g, about 0.2 g) of the polymer composition uniformly in a nonwoven fabric envelope and sealing the same, it was soaked in saline (0.9 wt %) at room temperature. After 30 minutes, the envelope was centrifuged at 250G for 3 minutes to drain, and the weight $W_2$ (g) of the envelope was measured. Further, after carrying out the same operation without using the resin, the weight $W_1$ (g) of the envelope was measured.

Then, CRC (g/g) was calculated by using the obtained weight values according to the following Equation 1.

$$CRC(g/g)=\{[W_2(g)-W_1(g)]/W_0(g)\}-1 \quad \text{[Equation 1]}$$

(2) Absorbency Under Pressure (AUP)

The absorbency under pressure at 0.3 psi of the super absorbent polymers prepared in Examples and Comparative Examples was measured according to the EDANA WSP 242.3 method.

First, in the measurement of the absorbency under pressure, the classified polymer of the above CRC measurement was used.

Specifically, a 400 mesh stainless steel screen was installed in a cylindrical bottom of a plastic having an inner diameter of 25 mm. $W_0$ (g, 0.16 g) of the super absorbent polymer composition was uniformly scattered on the screen at room temperature and a humidity of 50%. Thereafter, a piston which can uniformly provide a load of 0.3 psi was placed on the composition. Herein, the outer diameter of the piston was slightly smaller than 25 mm, there was no gap with the inner wall of the cylinder, and jig-jog of the cylinder was not interrupted. At this time, the weight $W_3$ (g) of the device was measured.

Subsequently, a glass filter having a diameter of 90 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight $W_4$ (g) was measured.

Then, absorbency under pressure (g/g) was calculated by using the obtained weight values according to the following Equation 2.

$$AUP(g/g)=[W_4(g)-W_3(g)]/W_0(g) \quad \text{[Equation 2]}$$

(3) Vortex Time

The vortex time of the super absorbent polymers prepared in Examples and Comparative Examples was measured in the following manner.

(1) First, after installing a thermometer in a 100 mL beaker with a flat bottom, 50 g of 0.9% saline was added, and a magnetic bar (8 mm in diameter, 30.0 mm in length) was put therein.

(2) Next, while stirring the magnetic bar at 600 rpm, when it was confirmed that the temperature of 24° C. was maintained and a vortex was generated by stirring, the thermometer was removed.

(3) Thereafter, 2 g of the super absorbent polymer sample was added, and the time taken until the vortex disappeared and the liquid surface became flat from the time the sample was added was measured in seconds, and this was taken as the vortex time.

(4) Permeability

The permeability of the super absorbent polymers prepared in Examples and Comparative Examples was measured in the following manner.

Specifically, lines were marked on the liquid surface of 20 mL and 40 mL of a chromatography tube (F20 mm) in which a piston was inserted. As the chromatography tube used at this time, a tube having a size of 250 mm in length and 22 mm in diameter equipped with a glass filter having a diameter of 20 mm (Glass Fritted Filter Disc, P3: 16-40 μm) and a lower valve (cock) was used. As the piston, a piston having a weight of 65 g was used to apply a pressure of 0.3 psi per unit area.

Thereafter, the piston was removed and water was inversely added so that bubbles were not generated between the glass filter and the lower valve at the bottom of the chromatography tube until about 10 ml of the tube was filled. Then, it was washed 2 to 3 times with 0.9 wt % saline and filled with saline up to 40 ml or greater. Thereafter, a piston was introduced to the chromatography tube, the lower valve was opened, and then the time (B) taken for the liquid surface to decrease from the line 40 ml to 20 ml was recorded.

Subsequently, 10 mL of saline was left in the chromatography tube, 0.2±0.0005 g of the classified (30 #~50 #) super absorbent polymer sample was added, saline was added to make the volume of saline 50 mL, and then left for 30 minutes. After that, the piston was introduced in the chromatography tube, left for 1 minute, and the lower valve of the chromatography tube was opened to record the time (T1) taken for the liquid surface to decrease from the line 40 mL to 20 mL. Then, the time (unit: sec) of T1−B was calculated according to Equation 3 below.

$$\text{Permeability(sec)}=T1-B \quad \text{[Equation 3]}$$

in Equation 3,

T1 is the time taken for a liquid surface to decrease from 40 mL to 20 mL after adding 0.2±0.0005 g of a classified (30 #~50 #) super absorbent polymer sample in the chromatography tube, adding saline to make a volume of the saline 50 mL, and leaving it for 30 minutes, and B is the time taken for a liquid surface to decrease from 40 mL to 20 mL in a chromatography tube filled with saline.

(5) Anti-Caking (A/C) Efficiency

The anti-caking efficiency of the super absorbent polymers prepared in Examples and Comparative Examples was measured in the following manner. At this time, the devices prepared to measure the anti-caking efficiency are as follows.

Electronic balance (accuracy: 0.01 g)

Constant temperature and humidity chamber (temperature: 40° C., humidity: 80% RH)

Petri dish (ø: 90 mm, height: 15 mm)

Stop watch

A4 paper (1) First, the weight ($W_5$) of the prepared Petri dish was measured.

(2) Next, 2±0.01 g of the super absorbent polymer sample was evenly applied to the weighed Petri dish.

(3) Thereafter, the Petri dish containing the super absorbent polymer sample was placed in a constant temperature and humidity chamber set at a temperature of 40° C. and a humidity of 80% RH, and left for 10 minutes.

(4) After 10 minutes, the Petri dish was taken out from the constant temperature and humidity chamber, turned over on the prepared A4 paper, and left for 5 minutes.

(5) After 5 minutes, the weight ($S_1$) of the super absorbent polymer sample that fell on the A4 paper and the weight ($S_2$) of the Petri dish at this time were respectively measured, and then the anti-caking efficiency was calculated by Equation 4 below. In this case, the obtained value was rounded off to first decimal place.

$$\text{Anti-caking efficiency (\%)} = \frac{S_1}{(S_2 - W_5) + S_1} * 100 \quad \text{[Equation 4]}$$

in Equation 4, $W_5$ is a weight (g) of a Petri dish having a diameter of 90 mm and a height of 15 mm, $S_1$ is a weight (g) of a super absorbent polymer sample fell on a A4 paper after evenly applying 2±0.01 g of a super absorbent polymer sample to a Petri dish weighing $W_5$, leaving the Petri dish applied with the sample in a constant temperature and humidity chamber set at a temperature of 40° C. and a humidity of 80% RH for 10 minutes, taking it out, turning it over on the A4 paper and then leaving it for 5 minutes, and $S_2$ is a weight (g) of the Petri dish at the time of measuring $S_1$.

TABLE 1

| | Physical properties of super absorbent polymer | | | | | | | |
|---|---|---|---|---|---|---|---|---|
| | Additive content[1)] | Inorganic material (AIS) content[2)] | particle size (#20-30/ #30-50/ #50-100[3)] | CRC (g/g) | AUP (g/g) | Vortex time (sec) | Permeability (sec) | A/C efficiency (%) |
| Example 1 | 0.4 | — | 21/67/12 | 30.0 | 29.5 | 23 | 18 | 60 |
| Example 2 | 0.4 | 0.1 | 8/67/25 | 30.5 | 28.8 | 26 | 15 | 67 |
| Example 3 | 0.4 | 0.2 | 5/69/26 | 30.2 | 28.6 | 27 | 14 | 78 |
| Example 4 | 0.4 | 0.3 | 5/70/25 | 30.2 | 28.5 | 30 | 13 | 98 |
| Example 5 | 0.4 | — | 20/66/14 | 31.0 | 28.9 | 24 | 19 | 58 |
| Example 6 | 0.4 | — | 19/67/14 | 29.6 | 29.3 | 24 | 19 | 61 |
| Example 7 | 0.4 | — | 17/70/13 | 30.2 | 29.0 | 25 | 17 | 56 |
| Comparative Example 1 | — | — | 23/68/9 | 30.4 | 30.2 | 24 | 41 | 43 |
| Comparative Example 2 | — | 0.3 | 10/67/23 | 30.3 | 28.1 | 24 | 18 | 72 |
| Comparative Example 3 | — | 0.1 | 20/68/12 | 30.5 | 28.7 | 25 | 31 | 53 |

[1)]in parts by weight based on 100 parts by weight of hydrogel polymer

[2)]in parts by weight based on 100 parts by weight of base resin

[3)]mesh (#20-30): particle size 600-850 μm, mesh (#30-50): particle size 300-600 μm, mesh (#50-100): particle size 150-300 μm Referring to Table 1, it was confirmed that the super absorbent polymer of Example 1 prepared by coarse pulverization after adding the carboxylic acid-based additive to the hydrogel polymer polymerized in the presence of an encapsulated foaming agent simultaneously improved permeability and anti-caking efficiency without lowering the absorption rate while having similar absorption performance to the super absorbent polymer of Comparative Example 1 prepared without adding such an additive during coarse pulverization. Therefore, it is confirmed that the permeability and anti-caking efficiency of the super absorbent polymer can be improved without using an inorganic material such as aluminum sulfate, which is usually added during the surface cross-linking process.

In addition, in the case of the super absorbent polymers of Examples 2 to 4 prepared by adding the carboxylic acid-based additive, followed by coarse pulverization, and then adding a small amount of an inorganic material such as aluminum sulfate in a surface treatment process, the permeability and anti-caking efficiency can be further improved even though the absorption rate is slightly lowered. Accordingly, the content of the inorganic material may be adjusted according to the purpose to which the super absorbent polymer is finally applied, so that physical properties suitable for the purpose may be achieved.

The invention claimed is:

1. A method of preparing a super absorbent polymer, comprising forming a hydrogel polymer by cross-linking polymerization of a water-soluble ethylene-based unsaturated monomer having at least partially neutralized acidic groups in the presence of an internal cross-linking agent, an encapsulated foaming agent, and a polymerization initiator;

coarsely pulverizing the hydrogel polymer after mixing with a carboxylic acid-based additive;

drying and pulverizing the coarsely pulverized hydrogel polymer to prepare a powdery base resin; and further cross-linking a surface of the powdery base resin in the presence of a surface cross-linking agent to form a surface cross-linked layer, wherein the carboxylic acid-based additive comprises at least one selected from the group consisting of a carboxylic acid represented by Chemical Formula 1 and a salt thereof:

Chemical Formula 1

$$A\!-\!\left(B_1-B_2\right)_n\!-\!C$$

wherein in Chemical Formula 1,

A is C5 to C21 alkyl, $B_1$ is —OCO—, —COO—, or —COOCH($R_1$)COO—, $B_2$ is —$CH_2$—, —$CH_2CH_2$—, —CH($R_2$)—, —CH═CH—, or —C≡C—, $R_1$ and $R_2$ are each independently C1 to C4 alkyl, n is an integer of 1 to 3, and C is a carboxyl group.

2. The method of claim 1, wherein the encapsulated foaming agent has a structure having a core comprising a hydrocarbon and a shell comprising a thermoplastic resin surrounding the core.

3. The method of claim 2, wherein the hydrocarbon comprises at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane, and the thermoplastic resin comprises a polymer formed from at least one monomer selected from the group consisting of a (meth)acrylate-based compound, a (meth) acrylonitrile-based compound, an aromatic vinyl compound, a vinyl acetate compound and a halogenated vinyl compound.

4. The method of claim 1, wherein the encapsulated foaming agent has an average diameter before expansion of 5 to 30 μm, and a maximum expansion ratio in air of 5 to 15 times.

5. The method of claim 1, wherein the encapsulated foaming agent is used in an amount of 0.005 to 1 part by weight based on 100 parts by weight of the water-soluble ethylene-based unsaturated monomer.

6. The method of claim 1, wherein in Chemical Formula 1,

A is $-C_6H_{13}$, $-C_{11}H_{23}$, $-C_{12}H_{25}$, $-C_{17}H_{35}$, or $-C_{18}H_{37}$.

7. The method of claim 1, wherein in Chemical Formula 1, $B_1$ is

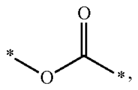, or 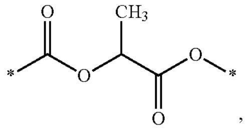, wherein * is a bonding site with a neighboring atom.

8. The method of claim 1, wherein in Chemical Formula 1, $B_2$ is

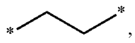, 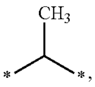, or 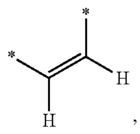, wherein * is a bonding site with a neighboring atom.

9. The method of claim 1, wherein the carboxylic acid-based additive comprises at least one selected from the group consisting of a carboxylic acid represented by Chemical Formula 1, an alkali metal salt thereof, and an alkaline earth metal salt thereof.

10. The method of claim 1, wherein the carboxylic acid-based additive comprises any one of compounds represented by Chemical Formulae 1-1 to 1-7:

1-1

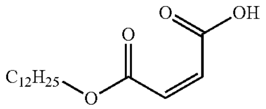

1-2

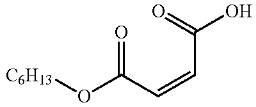

-continued 1-3

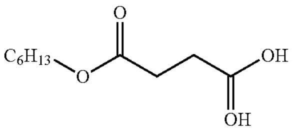

1-4

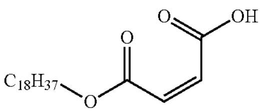

1-5

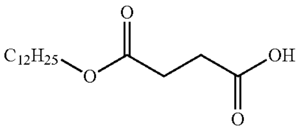

1-6

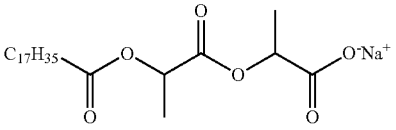

1-7

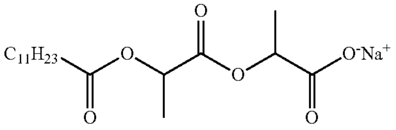

11. The method of claim 1, wherein the carboxylic acid-based additive is used in an amount of 0.01 to 1.0 parts by weight based on 100 parts by weight of the hydrogel polymer.

12. The method of claim 1, further adding at least one inorganic material selected from the group consisting of silica, clay, alumina, silica-alumina composite, titania, zinc oxide and aluminum sulfate together with the surface cross-linking agent in the further cross-linking the surface of the powdery base resin.

13. The method of claim 12, wherein the inorganic material is used in an amount of 0.001 to 0.3 parts by weight based on 100 parts by weight of the base resin.

14. The method of claim 1, wherein the super absorbent polymer has permeability measured according to Equation 3 of 40 seconds or less, and a vortex time at 24° C. of 30 seconds or less:

$$\text{Permeability(sec)} = T1 - B \qquad \text{Equation 3}$$

wherein in Equation 3,

T1 is time taken for a liquid surface to decrease from 40 mL to 20 mL after adding 0.2±0.0005 g of a classified (30 #to 50 #) super absorbent polymer sample in a chromatography tube, adding saline to make a volume of the saline 50 mL, and leaving it for 30 minutes, and B is the time taken for a liquid surface to decrease from 40 mL to 20 mL in a chromatography tube filled with saline.

15. The method of claim 1, wherein the super absorbent polymer has an anti-caking (A/C) efficiency calculated by Equation 4 of 50% or more:

$$\text{Anti-caking efficiency (\%)} = \frac{S_1}{(S_2 - W_5) + S_1} * 100 \quad \text{Equation 4}$$

wherein in Equation 4, $W_5$ is a weight (g) of a Petri dish having a diameter of 90 mm and a height of 15 mm, $S_1$ is a weight (g) of a super absorbent polymer sample fell on a A4 paper after evenly applying 2±0.01 g of a super absorbent polymer sample to a Petri dish weighing $W_5$, leaving the Petri dish applied with the sample in a constant temperature and humidity chamber set at a temperature of 40° C. and a humidity of 80% RH for 10 minutes, taking it out, turning it over on the A4 paper and then leaving it for 5 minutes, and $S_2$ is a weight (g) of the Petri dish at the time of measuring $S_1$.

* * * * *